United States Patent Office

LUDOVICO BRUNETTI, OF ROVIGNO, ITALY.

*Letters Patent No. 69,312, dated October 1, 1867.*

IMPROVED MODE OF EMBALMING AND PRESERVING ANIMAL SUBSTANCES.

*The Schedule referred to in these Letters Patent and making part of the same.*

TO WHOM IT MAY CONCERN:

Be it known that I, LUDOVICO BRUNETTI, of Rovigno, in the Kingdom of Italy, have invented a certain new and improved Process of Embalming and Preserving Animal Substances from decay; and I hereby declare the following to be a full, clear, and exact description of the same.

My invention consists of a new process for preserving animal bodies, with a view to embalming them, or for anatomical purposes.

The object of my process is to cause the preserving or embalming agents to act thoroughly, rapidly, and economically upon the elements and other primitive tissues, in order to impart to the latter the necessary modifications for their preservation after death. This process effects a new result, i. e., the preservation of the elements of the primitive tissue with all their anatomical characteristics, internal and external; the preservation of the vessels and capillary tubes in their state of natural dilation, empty and open to examination and study of their internal structure. Finally my anatomical pieces or specimens preserve in their tissues a certain degree of flexibility and elasticity, which renders them less liable to be damaged by falls, shocks, pressure, &c.

My process of preservation includes three principal operations, the preparation of the tissues, their tanning, and their desiccation.

First. The preparation of the tissues includes the operations of washing, removal of fatty matter, and expulsion.

Washing. The human or other animal body to be preserved, after having been cleaned externally and internally by water, should be entirely freed from blood. I obtain this result by injections of pure water into the vessels, and into the excretory canals, if there be any, in the body or piece which is operated on. An exit should, of course, be left for the water, according as the injection is made in an artery, a vein, or in the excretory canals. If it is required to operate on any other than a human subject, in order to facilitate this operation I kill the animal by injecting a solution of phosphate of soda into the carotid in order to prevent the blood from coagulating. This operation of removing or expelling the blood takes from two to fifteen hours.

Removal of fatty matter: The tissues should be thoroughly freed from grease or fatty matter. This is effected by injections of sulphuric ether, which, through the medium of the vessels, penetrates to the elements and primitive tissues. This operation can be facilitated if, before the injection of ether is made, alcohol be injected. The injection of the alcohol occupies about one quarter of an hour, that of the ether from two to twenty hours. Ordinarily, after the injection of the alcohol, I leave the piece immersed in alcohol, where it remains until I am ready to continue the preparation. I can also stop the preparation, after the injection of the ether, which is still better.

Expulsion: When the tissues are freed from blood and fat, before tanning them they should be thoroughly cleansed of the ether. This result is obtained first by an injection of alcohol, and afterwards by prolonged injections of pure water. The injection of the alcohol consumes about half an hour, that of the water from two to eight hours. After the injection of the alcohol I can arrest or stop the preparation; but after the injection of the water it is absolutely necessary to continue the preparation, that is to say, the process of tanning should be commenced.

Second. The tanning: This operation is simple. I cause the tannin (*Acidum tannicum*) to penetrate to the elements and primitive tissues, dissolving it in a sufficient quantity of distilled water heated to the boiling point, and injecting it, while tepid or warm, either into the artery, or veins, or excretory canals. This operation ordinarily requires from two to five hours. If the piece is large and formed of all the tissues it will take even ten hours or more. Sometimes the whole operation may be completed in two days, but this can only be accomplished by constant and unintermittent attention. Since the force of the injection keeps the capillary vessels dilated the tannin easily reaches the elementary tissues. This, however, is effected with difficulty if the injection is checked or stopped for some hours, so as to allow the capillary tubes to contract, a contraction which becomes more considerable by reason of the action of the tannin, which augments the thickness of the sides or coating of the capillary vessels. It will be readily understood that from the time the tannin is employed iron or steel instruments should be no longer used. In order to tie up the vessels woollen thread should alone be employed, for a thread of vegetable matter stains or spots the piece which is being prepared, and silk cuts the tissues.

Third. Desiccation: The desiccation or drying of the piece is effected by means of heat applied externally and internally. The external heat is caused to act by placing the piece in a tin furnace or oven provided with double walls, between which there should be held water maintained at the boiling point, and so as to raise the temperature of the air within the oven to 92° centigrade.

I cause the heat to act internally in the following manner: By means of a suction and force-pump the air is driven and compressed into a strong metal receiver until there is a pressure of about one atmosphere. A continuous current of compressed air is allowed to escape from the receiver through gutta-percha tubes, the current passing to the vessels and excretory canals, if there be any, so as to penetrate to the elements and primitive tissues. It is, of course, evident that the air which passes out from the receiver must be replaced by a fresh supply, which is introduced by means of the pump. The air should be both dry and warm; this condition being obtained by interposing between the air-receiver and the oven a bottle filled with desiccating substance, such as chloride of calcium dried, and a heated copper box. The air which traverses the bottle and the box becomes dry and warm. The current of air acts from the centre to the periphery of the piece, and its force, regulated by a stop-cock, should be such that the piece which is being prepared shall acquire and maintain its natural size and form.

The desiccation is completed quickly, that is to say in from an hour and one-half to five hours. By means of the external heat which surrounds the piece which is being prepared, and the continuous dry and warm current of air which penetrates to the primitive tissues, the desiccation is completed quickly, $i.\ e.$, in from an hour and a half to five hours. It is by the action of this current of air that the important result is attained of preserving the volume and the external form of all the viscera, of preserving all their internal parts, how small soever they may be, in their reciprocal anatomical relations to each other, and consequently of preserving the internal microscopic structure.

My method differs from all others in this, that in other methods of preserving anatomists must, first of all, study patiently the piece or specimen which they wish to preserve before proceeding with its preparation; but by my method there is no necessity for this preliminary study of the mysterious and invisible internal formation and structure. I immediately proceed with the preparation. As soon as it is completed each cut of the knife opens pages on which are written the truths of the real physiological or pathological condition of the body, which have heretofore required such extended and prolonged researches in order to be established. My invention, had it been known before, would have saved anatomists many years of labor and study.

I continue the desiccation until I observe that upon stopping instantaneously the current of air the piece preserves its natural size and shape, and until the exterior of the piece is almost entirely dry.

Ordinarily I accomplish the desiccation in the following manner: I cut the piece and wrap the slices in blotting-paper, surrounding them with very dry plaster, which is changed from time to time until the desiccation is completed. One modification of this method consists in dispensing with the tanning operation, that is to say, after having removed the fatty matter by the use of ether, I proceed at once with the desiccation. The preparations or specimens which are thus obtained are semi-transparent, and in these the chemist can discover no foreign substance, whilst in the others the tannin is perceptible, not, however, in a free state, but combined with the tissues.

The utensils for injecting the water, alcohol, ether, and tannin are entirely simple in construction. I place the liquid at a height of about four metres and cause it to descend through a vertical tube; the flow being regulated by a stop-cock on the lower extremity of the tube. The cock is put in communication with the viscera by means of gutta-percha tubes.

It may be well, perhaps, to indicate the quantity of tannic acid I employ in certain instances. I estimate at forty grammes the quantity of tannic acid to be injected for the healthy heart of an adult; for the lungs, seventy grammes; for the liver, sixty grammes; for the lungs and heart of a fœtus of the full term, thirty grammes; for a head without the brain, with the neck, ninety grammes. The pieces, after being prepared by my process, are decolorized, since all the blood has been removed from them; but after being injected with the tannic acid they may be colored by means of an injection of any color desired.

Having described my invention, and the manner in which the same is or may be carried into effect, what I claim, and desire to secure by Letters Patent, is—

The method of and means for embalming or preserving animal substances from decay, substantially as herein set forth and described.

In testimony whereof I have signed my name to this specification before two subscribing witnesses.

L. BRUNETTI.

Witnesses:
   J. ARMENGAUD,
   C. LAFOND.